UNITED STATES PATENT OFFICE.

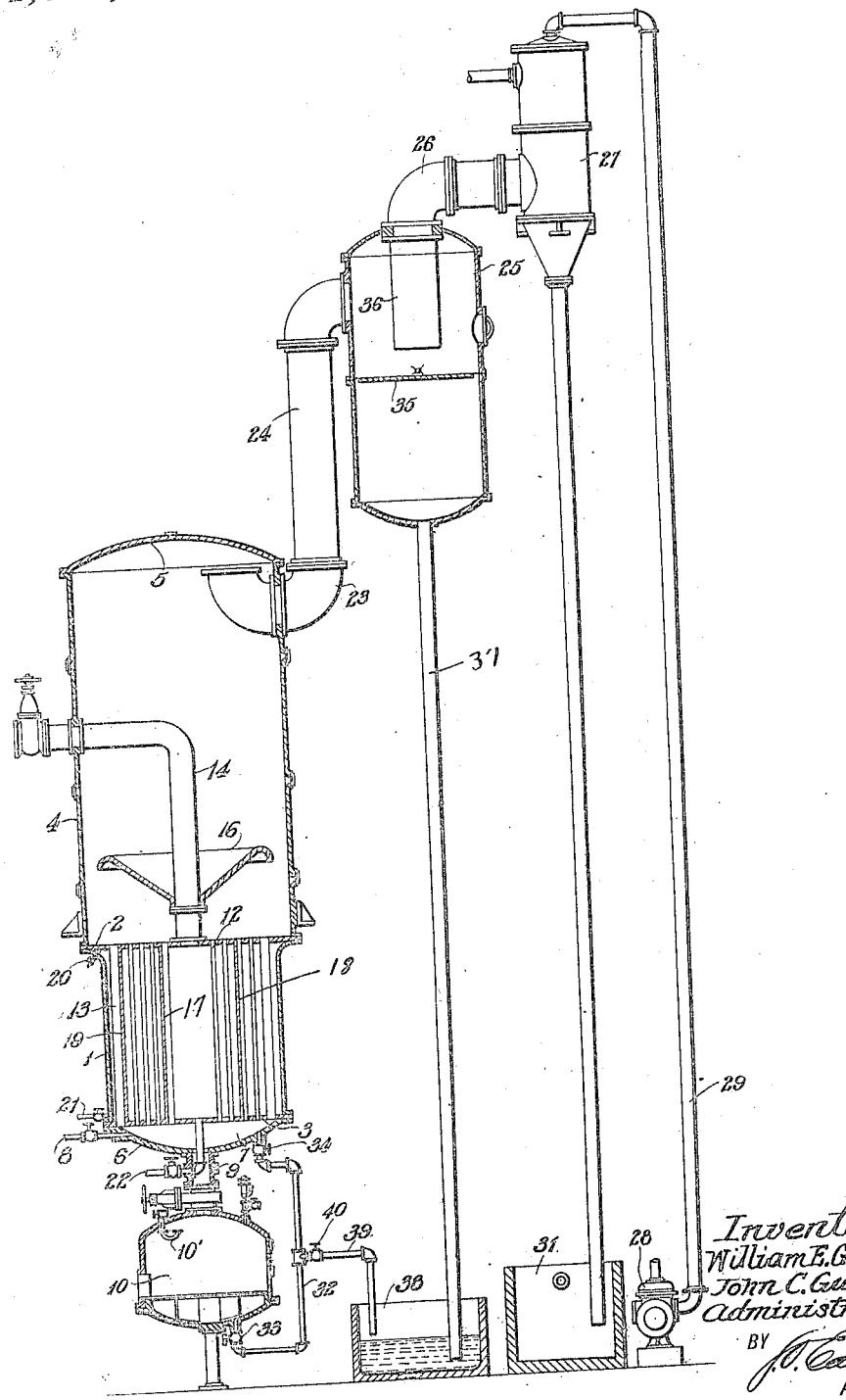

WILLIAM E. GARRIGUE, DECEASED, LATE OF CHICAGO, ILLINOIS, BY JOHN C. GUENTHNER, ADMINISTRATOR, OF CHICAGO, ILLINOIS, ASSIGNOR TO WILLIAM GARRIGUE & COMPANY, INC., OF NEW YORK, N. Y., A CORPORATION OF NEW YORK.

EVAPORATOR.

1,317,488.        Specification of Letters Patent.     Patented Sept. 30, 1919.

Original application filed September 28, 1917, Serial No. 193,757. Divided and this application filed February 19, 1919. Serial No. 278,168.

*To all whom it may concern:*

Be it known that WILLIAM E. GARRIGUE, now deceased, formerly a citizen of the United States, and a resident of Chicago, in the county of Cook and State of Illinois, invented certain new and useful Improvements in Evaporators, of which the following is a specification.

The invention of the said WILLIAM E. GARRIGUE relates to apparatus for evaporating liquids, and the present application is a division of his patent entitled Evaporators, No. 1,298,925, dated April 1, 1919. The latter application describes and claims a construction in which a steam heated calandria is provided with various improved details of construction such that the liquid to be evaporated will circulate upwardly through inner tubes and descend through outwardly arranged tubes so as to sweep all crystals and other solid material toward the center in the space beneath the lower head or tube sheet.

In evaporators of this character, the vapors are drawn by vacuum from the calandria to a condenser, and the invention which forms the subject-matter of the present application consists in causing the vapors to pass through an elevated separating vessel on the way to the condenser, the bottom of said separating vessel being connected by a barometric column of liquid with a vessel on a lower level containing liquid. The construction is such that any liquid carried over from the calandria to the elevated separating vessel with the vapor will drop through the tube to the vessel below, in which it will be readily apparent. This furnishes an indication that the heating is being conducted too rapidly, so that the heat supply may be diminished until liquid no longer appears in the vessel at the bottom of the tube referred to. This vessel may be connected if desired with the bottom of the evaporator and the liquid collected in the vessel drawn back into the system whenever desired.

In order that a clearer understanding of the invention may be had, attention is hereby directed to the accompanying drawing forming part of this application and illustrating one embodiment of the invention. In the drawing the figure represents a view partly in elevation and partly in section of an evaporating system comprising the invention.

Referring to the drawings, the calandria illustrated comprises a casing 1, preferably cylindrical, having upper and lower heads 2 and 3 extending across the same. A casing 4 extends upwardly from casing 1 and is provided with a top plate 5. Casing 1 is closed at the bottom by a plate 6, which preferably slopes downwardly from the periphery to the center thereof, providing a space 7 below the lower header, into which extends a pipe connection 8 for introducing the liquid to be evaporated. The central or lower portion of the bottom plate 6 of the evaporator below the calandria is connected by a tubular member 9 with the vessel 10 in which crystals and solid matter are to be collected.

The evaporating tubes which extend between and through the heads 2 and 3 comprise a considerable number of inner tubes 12 and a series of outer tubes 13 of larger diameter than tubes 12. A heating medium, such as superheated steam, may be introduced at the axis of the calandria, in a space surrounded by the inner ones of the tubes 12, by means of a pipe 14. Preferably, a conical dash plate 16 is secured about the lower portion of pipe 14. Also preferably, baffle plates 17, 18 and 19 are mounted between the tubes in such a manner as to cause the steam to pass around the inner tubes 12 successively from the center toward the periphery and then around the outer tubes 13. The outer casing 1 may be provided with a pair of vents 20 and 21 connected with the outer steam space within the calandria, through which air and other non-condensable gases may be removed. The apparatus described may, of course, be connected with similar apparatus for multiple effect operation, if desired. A drip pipe 22 is connected with the lower portion of the steam space in the calandria, to remove the condensed steam. The details described form no part of the present invention.

The upper portion of the evaporator is connected, as is usual in apparatus of this character, by means of an elbow 23, pipe 24, separator 25 and pipe connection 26 with a condenser 27, vacuum being maintained in the system as by means of a vacuum pump 28, connected to the condenser by a pipe 29. The condenser is connected by pipe 30 to the usual hot well 31.

Liquid rising with the vapor from the inner tubes 12 of the calandria is deflected by dash plate 16 toward the periphery and falls into the outer tubes 13 in which it will descend, move toward the center in the bottom space 7 and then rise through the inner tubes, so that there will be a continuous circulation as long as liquid remains in the apparatus. Crystals formed in the liquid will be swept along the bottom plate 6 of the evaporator toward the center by the current of liquid and will drop into the collecting vessel 10. A pipe connection 32 provided with valves 33 and 34 extends from the bottom of collecting vessel 10 to the space 7 at the bottom of the evaporator, so that liquid in vessel 10 may be drawn back into the system when desired upon opening valves 33 and 34, steam being blown into vessel 10 if desired through connection 10'.

The separating vessel 25 is provided with a screen 35 and has an upwardly extending pipe 36 in its upper portion leading through connection 26 to the condenser. Vapor entering the separating chamber from connection 24 passes through pipe 36, while any liquid which may be carried with the vapor will fall through screen 35 and through the tube 37 extending into a liquid seal in the open vessel 38. Pipe 37 is of sufficient length to balance the vacuum in the system, and may be filled with water. Liquid dropping through the separating chamber and pipe 37 will appear in the liquid in vessel 38 and thereby provide an indication of the manner in which the process is being carried out. Vessel 38 may be connected by pipe connection 39, provided with a valve 40, with pipe 32, so that when desired the liquid in vessel 38 may be drawn into the evaporator, valves 34 and 40 being opened and valve 33 closed.

What I claim is:

1. In an evaporator, the combination with a calandria, a separating chamber and a condenser connected in series, of an open vessel containing liquid below said separating chamber, and a tube containing a barometric column of liquid connecting the lower portion of said chamber with said open vessel.

2. In an evaporator, the combination with a calandria, a separating chamber and a condenser connected in series, of an open vessel containing liquid below said separating chamber, a tube containing a barometric column of liquid connecting the lower portion of said chamber with said open vessel, and a valved connection between said vessel and the lower portion of the evaporator.

This specification signed and witnessed this 15th day of Feb., 1919.

JOHN C. GUENTHNER,
*Administrator of the estate of William E. Garrigue, decd.*